United States Patent

Kolar et al.

[11] Patent Number: 6,082,287
[45] Date of Patent: Jul. 4, 2000

[54] LOCATION INDICATING SYSTEM

[76] Inventors: Roger Kolar; Rose Mary Kolar, both of 739 W. Walnut Ave., Monrovia, Calif. 91016

[21] Appl. No.: 09/061,209

[22] Filed: Apr. 16, 1998

[51] Int. Cl.[7] ...................................................... B64B 1/40
[52] U.S. Cl. ...................................... 116/210; 116/DIG. 8
[58] Field of Search ............................... 116/210, DIG. 8, 116/DIG. 9; 441/93, 94, 9, 30, 40, 41, 66; 446/220, 222, 225, 226; 222/5

[56] References Cited

U.S. PATENT DOCUMENTS

| | | | |
|---|---|---|---|
| 2,821,725 | 2/1958 | Harper | 116/210 |
| 3,187,712 | 6/1965 | Pritchard et al. | 116/210 |
| 3,547,073 | 12/1970 | Colandrea | 116/210 |
| 4,094,267 | 6/1978 | Davis, Jr. | 116/210 |
| 4,433,638 | 2/1984 | Ashline | 116/210 |
| 4,944,242 | 7/1990 | Russell | 116/210 |
| 5,020,467 | 6/1991 | Van Patten et al. | 116/210 |
| 5,049,106 | 9/1991 | Kim et al. | 116/210 |
| 5,582,127 | 12/1996 | Willis et al. | 116/210 |

*Primary Examiner*—Andrew H. Hirshfeld

[57] ABSTRACT

A location indicator system is provided including a gas tank for containing helium gas therein. Also included is an actuation assembly for releasing the gas from the tank. Connected to the tank is a balloon adapted to inflate and lift the balloon upon the release of the gas from the tank.

2 Claims, 1 Drawing Sheet

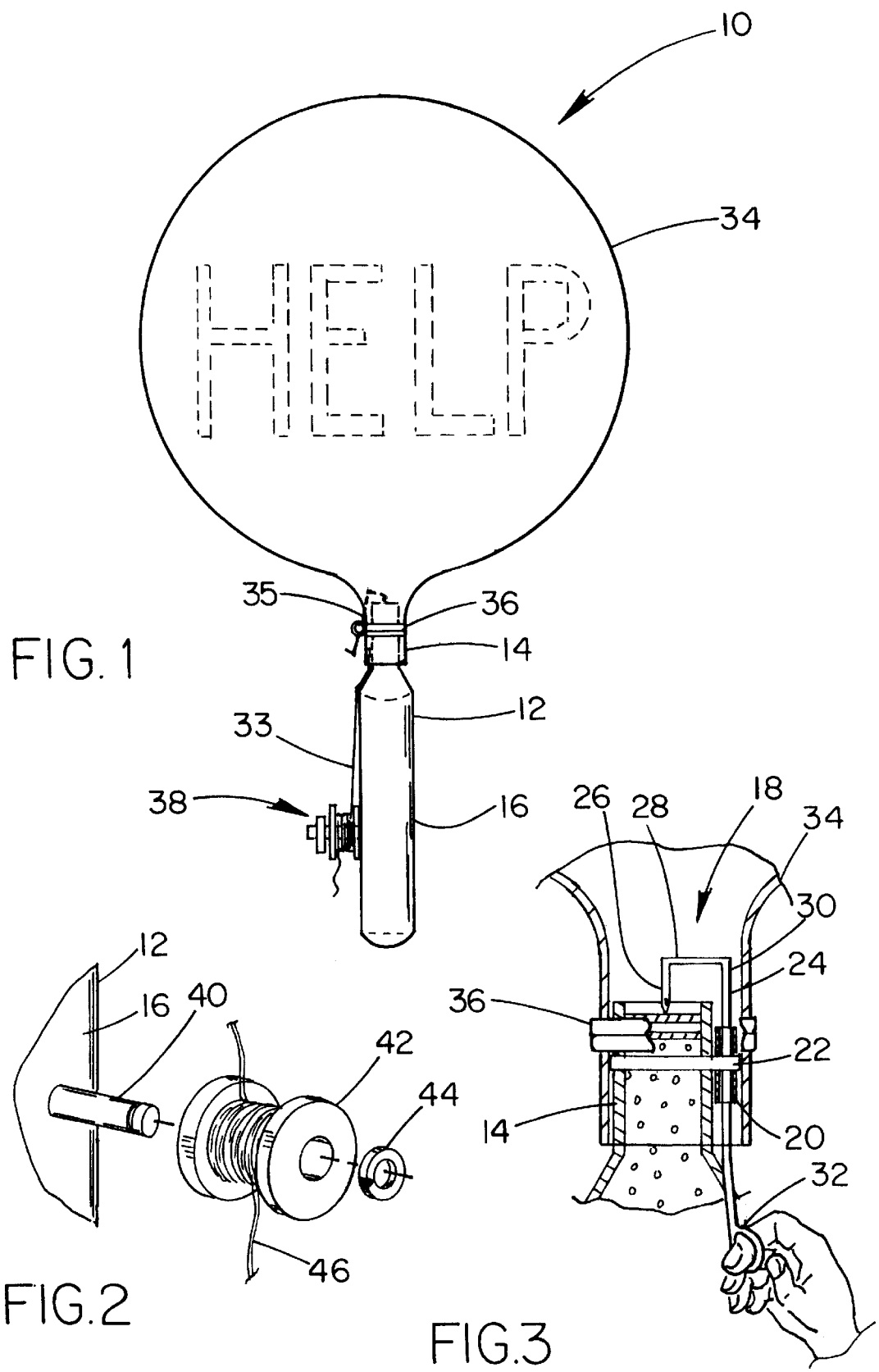

LOCATION INDICATING SYSTEM

BACKGROUND OF THE INVENTION

1. Field of the Invention

The present invention relates to balloon distress signals and more particularly pertains to a new location indicating system for identifying a location of a user.

2. Description of the Prior Art

The use of balloon distress signals is known in the prior art. More specifically, balloon distress signals heretofore devised and utilized are known to consist basically of familiar, expected and obvious structural configurations, notwithstanding the myriad of designs encompassed by the crowded prior art which have been developed for the fulfillment of countless objectives and requirements.

Known prior art balloon distress signals include U.S. Pat. No. 5,301,631; U.S. Pat. No. 2,862,531; U.S. Pat. No. 4,295,438; U.S. Pat. No. 4,586,456; U.S. Pat. No. 3,017,907; and Foreign Patents WO 79/009654 A1 and EP 0 240 468.

In these respects, the location indicating system according to the present invention substantially departs from the conventional concepts and designs of the prior art, and in so doing provides an apparatus primarily developed for the purpose of identifying a location of a user.

SUMMARY OF THE INVENTION

In view of the foregoing disadvantages inherent in the known types of balloon distress signals now present in the prior art, the present invention provides a new location indicating system construction wherein the same can be utilized for identifying a location of a user.

The general purpose of the present invention, which will be described subsequently in greater detail, is to provide a new location indicating system apparatus and method which has many of the advantages of the balloon distress signals mentioned heretofore and many novel features that result in a new location indicating system which is not anticipated, rendered obvious, suggested, or even implied by any of the prior art balloon distress signals, either alone or in any combination thereof.

To attain this, the present invention generally comprises a helium tank with a cylindrical configuration. As shown in FIG. 1, the tank has an upper extent with a first diameter and a first height. The tank further has a lower extent with a second diameter less than the first diameter and a second height less than the first height. An open top of the tank is equipped with a seal formed thereon for containing helium gas within the tank. Next provided is an actuation assembly including a small rigid conduit coupled to an outer surface of the upper extent of the tank. As shown in FIG. 3, the conduit is positioned about an axis in parallel with that of the tank. The actuation assembly further includes a pin having a first vertical portion with a sharpened bottom end. A horizontal portion is coupled to a top end of the first vertical portion and extends therefrom in perpendicular relationship therewith. Coupled to an end of the horizontal portion is a second vertical portion which depends downwardly through the rigid conduit. A bottom end of the pin is equipped with a finger loop. In use, the pin of the actuation assembly may be pulled downwardly for puncturing the seal of the tank to release helium therefrom. FIG. 1 shows a balloon constructed from a flexible fluorescent material. Preferably, the balloon has glow-in-the-dark indicia situated thereon. The balloon has a spherical configuration with a tubular input coupled thereto. The tubular input has an opening for encompassing the upper extent of the helium tank and the rigid conduit of the actuation assembly. The tubular input is preferably sealed over the tank and actuation assembly by way of a band. By this structure, the balloon is adapted to inflate and lift the helium tank upon the release of helium from the tank. Finally, a spool assembly is provided including a linear post having an inboard end integrally coupled to a central extent of the tank and extending radially therefrom. An outboard end of the post has a concentric groove formed therein for reasons that will soon become apparent. The spool assembly further includes a spool having a hollow sleeve with a pair of disk-shaped retainers integrally coupled to opposite ends of the sleeve. The sleeve of the spool is rotatably coupled to the post with a locking washer mounted on the concentric groove. The locking washer functions for maintaining the spool on the post. A string is mounted on the spool for dispensing while the balloon rises.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new location indicating system apparatus and method which has many of the advantages of the balloon distress signals mentioned heretofore and many novel features that result in a new location indicating system which is not anticipated, rendered obvious, suggested, or even implied by any of the prior art balloon distress signals, either alone or in any combination thereof.

It is another object of the present invention to provide a new location indicating system which may be easily and efficiently manufactured and marketed.

It is a further object of the present invention to provide a new location indicating system which is of a durable and reliable construction.

An even further object of the present invention is to provide a new location indicating system which is susceptible of a low cost of manufacture with regard to both materials and labor, and which accordingly is then susceptible of low prices of sale to the consuming public, thereby making such location indicating system economically available to the buying public.

Still yet another object of the present invention is to provide a new location indicating system which provides in the apparatuses and methods of the prior art some of the advantages thereof, while simultaneously overcoming some of the disadvantages normally associated therewith.

Still another object of the present invention is to provide a new location indicating system for identifying a location of a user.

Even still another object of the present invention is to provide a new location indicating system that includes a gas tank for containing helium gas therein. Also included is an actuation assembly for releasing the gas from the tank. Connected to the tank is a balloon adapted to inflate and lift the balloon upon the release of the gas from the tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front view of a new location indicating system according to the present invention.

FIG. 2 is an exploded view of the spool assembly of the present invention.

FIG. 3 is a side cross-sectional view of one of the embodiments of the actuation assembly of the present invention.

DESCRIPTION OF THE PREFERRED EMBODIMENT

With reference now to the drawings, and in particular to FIGS. 1 through 3 thereof, a new location indicating system embodying the principles and concepts of the present invention and generally designated by the reference numeral 10 will be described.

The present invention, designated as numeral 10, includes a helium tank 12 with a cylindrical configuration. As shown in FIG. 1, the tank has an upper extent 14 with a first diameter and a first height. The tank further has a lower extent 16 with a second diameter greater than the first diameter and a second height greater than the first height. An open top of the tank is equipped with a seal for containing helium gas within the tank.

Next provided is an actuation assembly 18 including a small rigid conduit 20 coupled to an outer surface of the upper extent of the tank. As shown in FIG. 3, the rigid conduit is positioned about an axis in parallel with that of the tank. In the preferred embodiment, the rigid conduit is mounted on the tank via a ring 22.

The actuation assembly further includes a pin 24 having a first vertical portion 26 with a sharpened bottom end. A horizontal portion 28 is coupled to a top end of the first vertical portion and extends therefrom in perpendicular relationship therewith. Coupled to an end of the horizontal portion is a second vertical portion 30 which depends downwardly through the rigid conduit and has a length which is at least three times that of the first vertical portion. A bottom end of the second vertical portion of the pin is equipped with a finger loop 32.

In use, the pin of the actuation assembly may be pulled downwardly for puncturing the seal of the tank to release helium gas therefrom. It should be noted that the second vertical portion of the pin has some flexibility to accommodate the transition between the upper and lower extents of the tank. Note FIG. 3. It should also be noted that alternate spring loaded forms of actuation assemblies may be employed in lieu of that just set forth. For example, an actuation cord 33 may be attached to a spring biased pin 35 such that air is released when the string is pulled, as shown in FIG. 1.

FIG. 1 shows a balloon 34 constructed from a flexible fluorescent Mylar material. Preferably, the balloon has glow-in-the-dark indicia situated thereon. It should be understood that either the balloon material or the indicia may be equipped with the fluorescent and/or glow-in-the-dark feature. The balloon has a spherical configuration with a tubular input. In the alternative, the balloon may have a cross-shaped configuration. The tubular input of the balloon has an opening for encompassing the upper extent of the helium tank and the rigid conduit of the actuation assembly. The tubular input is preferably sealed over the tank and actuation assembly by way of a band 36. By this structure, the balloon is adapted to inflate and lift the balloon upon the release of helium from the tank.

Finally, a spool assembly 38 is provided including a linear post 40 having an inboard end integrally coupled to a central extent of the tank and extending radially therefrom. An outboard end of the post has a concentric groove formed therein for reasons that will soon become apparent.

The spool assembly further includes a spool 42 having a hollow sleeve with a pair of disk-shaped retainers integrally coupled to opposite ends of the sleeve. The sleeve of the spool is rotatably coupled to the post with a locking washer mounted on the concentric groove. The locking washer 44 functions for maintaining the spool on the post. A string 46 is mounted on the spool of the spool assembly for dispensing while the balloon rises.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A location indicator system comprising, in combination:

a helium tank with a cylindrical configuration having an upper extent with a first diameter and a first height and a lower extent with a second diameter greater than the first diameter and a second height greater than the first height, the tank having a closed bottom and an open top with a seal formed thereon for containing helium gas within the tank;

an actuation assembly including a small rigid conduit coupled to an outer surface of the upper extent of the tank about an axis in parallel with that of the tank, the actuation assembly further including a pin having a first vertical portion with a sharpened bottom end, a horizontal portion coupled to a top end of the first vertical portion and extending therefrom in perpendicular relationship therewith, and a second vertical portion coupled to an end of the horizontal portion and depending downwardly through the rigid conduit with a bottom end having a finger loop formed therein, whereby the pin of the actuation assembly may be pulled downwardly for puncturing the seal of the tank to release helium therefrom;

a balloon being constructed from a flexible fluorescent material and having glow-in-the-dark indicia situated thereon, the balloon having a spherical configuration and a tubular input coupled thereto with an opening for encompassing the upper extent of the helium tank and the rigid conduit of the actuation assembly and sealed thereover by way of a band, whereby the balloon is adapted to inflate and lift the balloon upon the release of helium from the tank; and a spool assembly including a linear post having an inboard end integrally coupled to a central extent of the tank and extending radially therefrom and an outboard end with a concentric groove formed therein and a spool having a hollow sleeve with a pair of disk-shaped retainers integrally coupled to opposite ends of the sleeve in concentric relationship therewith, the sleeve of the spool being rotatably coupled to the post with a locking washer mounted on the concentric groove for maintaining the spool on the post, wherein a string is mounted on the spool of the spool assembly for dispensing while the balloon rises.

2. A location indicator system comprising:

a helium tank with a cylindrical configuration having an upper extent and a lower extent, the helium tank having a closed bottom and an open top with a seal formed thereon for containing helium gas within the tank;

an actuation assembly including a conduit coupled to an outer surface of the upper extent of the tank, the actuation assembly further including a pin having a first portion with a sharpened bottom end, a second portion coupled to a top end of the first portion, and a third portion coupled to an end of the second portion and depending downwardly through the conduit with a bottom end having a finger loop formed therein, whereby the pin of the actuation assembly may be pulled toward the tank for puncturing the seal of the tank to release helium therefrom;

a balloon being constructed from a flexible material, the balloon having a tubular input with an opening for encompassing the upper extent of the helium tank and the conduit of the actuation assembly, the tubular input being held over the upper extent of the helium tank by way of a band, whereby the balloon is adapted to inflate and lift the balloon away from the tank upon the release of helium from the tank; and a spool assembly including a post having an inboard end integrally coupled to the tank and an outboard end with a concentric groove formed therein and a spool having a hollow sleeve with a pair of disk-shaped retainers integrally coupled to opposite ends of the sleeve in concentric relationship therewith, the sleeve of the spool being rotatably coupled to the post , wherein a string is mounted on the spool of the spool assembly and to the balloon for dispensing the string from the spool while the balloon rises.

* * * * *